United States Patent [19]

Rosshirt

[11] Patent Number: 4,746,849
[45] Date of Patent: May 24, 1988

[54] TWO LEAD BIDIRECTIONAL STEPPING MOTOR CONTROL

[75] Inventor: Hermann Rosshirt, Bristol, Conn.

[73] Assignee: North American Philips Corporation, New York, N.Y.

[21] Appl. No.: 21,873

[22] Filed: Mar. 4, 1987

Related U.S. Application Data

[63] Continuation-in-part of Ser. No. 943,473, Dec. 16, 1986, abandoned.

[51] Int. Cl.$^4$ ............................................... H02P 8/00
[52] U.S. Cl. ..................................... 318/696; 318/685
[58] Field of Search .................................. 318/696, 685

[56] References Cited

U.S. PATENT DOCUMENTS 4,476,421 10/1984 Moriguchi ........................... 318/696

Primary Examiner—William M. Shoop, Jr.
Assistant Examiner—M. Bergmann
Attorney, Agent, or Firm—Jack E. Haken

[57] ABSTRACT

A two wire control circuit for a bidirection variable speed stepping motor having motor drive logic adjacent to the motor. The control signals are momentary pulses which are superimposed on the supply line. The very short duration pulses are not recognized by the motor, but are used to trigger the sequence of the motor drive logic and through a low pass filter, the same modulated power supply line can power the drive logic.

6 Claims, 2 Drawing Sheets

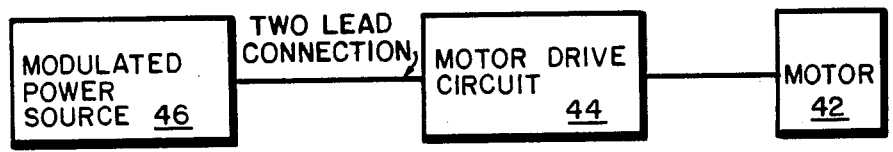
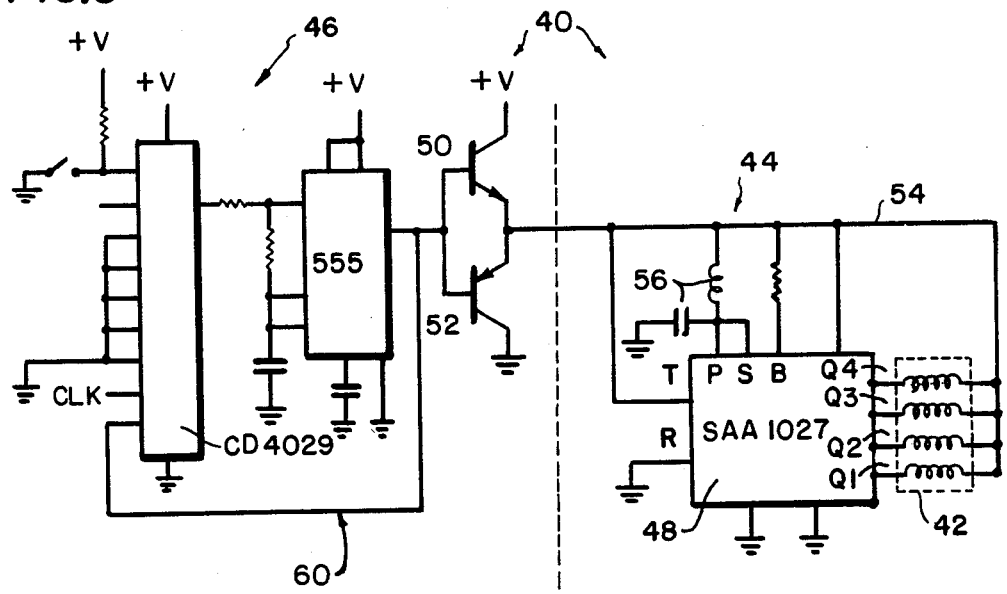

TWO LEAD BIDIRECTIONAL STEPPING MOTOR CONTROL

CROSS-REFERENCE TO RELATED APPLICATION

This application is a continuation-in-part of prior application Ser. No. 943,473, filed Dec. 16, 1986, now abandoned.

BACKGROUND OF THE INVENTION

1. Field of the Invention

The invention pertains to control circuits for motors and in particular to a control circuit for a polyphase stepping motor in which sequence control signals are superimposed on the motor supply line.

2. Description of the Prior Art

A standard two phase stepping motor requires three to five (or more) leads connected to its power drive which, in turn, are connected to a switching logic, which logic may be in, on or in the vicinity of the stepping motor. The conventional drive circuits for stepping motors consist of appropriate motor phase driving switches, power input, trigger input, direction control, and sequence logic. The phase drive outputs must be sequenced in a defined order for proper motor operation. To change the running direction of the motor, the sequence is reversed. A trigger input signal to the drive logic advances the sequence one step at a time, and a direction input signal determines the direction of rotation. For a typical two phase stepping motor, a four step sequence is used to complete one electrical cycle. For the sequence logic, commonly a shift left/shift right register is used and an input signal is used to control the direction of shifting.

The problem with the prior art control circuits described above is that they require three to five, or even more leads connected to the power drive which, in turn, are connected to the switching logic. The number of wires and the number of connections required is excessive for the trend toward microprocessor based control systems, many of which use only a two wire bus.

U.S. Pat. No. 4,341,982 discloses a system for simultaneously and independently controlling a plurality of motors. The system operates by transmission of duty cycle modulated selected frequencies superimposed on a DC track voltage on a common power line servicing the motors. This two wire system is significantly different in purpose and construction from the present invention.

Japanese Kokai No. 58-54897 discloses a driving device for pulse motors which decreases the number of signal cables by transmitting signals having differing pulse widths on the same signal wire, discriminating between signals in response to pulse width at the receiving circuit side for driving and controlling a pulse motor.

SUMMARY OF THE INVENTION

The object of the present invention is to control a polyphase stepping motor using only two leads between the power source and the motor drive circuit, one of which may be the ground return lead and one of which is hot. The motor drive circuit which includes the drive sequence logic is preferably incorporated in, on or in the vicinity of the stepping motor. The two wire control circuit of the present invention permits the stepping sequence, direction of rotation, speed and angular distance to be controllable.

The present invention provides a two lead connection between a modulated power source and a motor drive circuit for a bidirectional variable speed stepping motor with drive logic in, on or in the vicinity of the stepping motor.

The modulation of the power source is accomplished by switching the power source on and off momentarily, that is, for periods of a very short duration. Multiple turnoffs in a very short period of time would constitute a burst of pulses. These pulses are fed to the trigger input of the motor drive logic circuit. For every momentary turnoff of the power source, the motor drive logic causes a stepping motor to step one step in the sequence of steps. The rotation of the motor, the amount of angular rotation and the speed of the motor can all be controlled by the number of turnoffs in a burst and/or the rate of repetitive turnoffs. The number of turnoffs in a burst depends on how many phases the motor has or how many steps in the sequence there are for one electrical cycle. The short duration pulses on the power line are not recognized by the motor itself and therefore have no effect on it. Thus the stepping motor is controllable by only two leads between its power source and its motor drive logic because the sequence control signals are superimposed on the power lead.

In the preferred embodiment of this invention only a one direction sequence logic is used and the direction of the motor is changed by advancing the usual four step sequence logic used for a two phase motor by three steps of the sequence at a time, thus generating a reverse direction in the sequence and eliminating an input terminal.

BRIEF DESCRIPTION OF THE DRAWINGS

FIG. 2 is a functional block diagram of the present invention in context;

FIG. 3 is a circuit diagram of the two wire stepping motor control circuit of the present invention;

DESCRIPTION OF THE PREFERRED EMBODIMENT

The present invention pertains to a control circuit for a bidirectional variable speed multiphase stepping motor with the motor drive logic in, on or in the vicinity of the stepping motor, which uses only two leads between the power supply and the motor drive circuit and wherein the stepping sequence of the motor is controlled by superimposing the control signals onto the power supply line. The power supply line is modulated with short duration pulses wherein the number and the spacing of the pulses determine the stepping sequence, direction of rotation, speed, and angular distance of the stepping motor.

Figure 1:
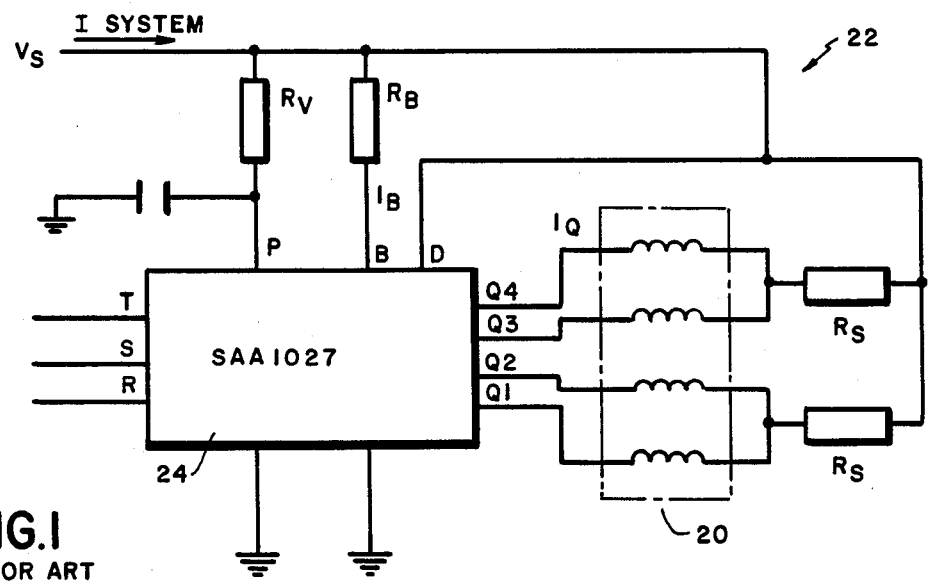
FIG. 1 is a circuit diagram for pulse to step control of two phase stepping motors as commonly used in the prior art.

FIG. 1 illustrates a typical prior art stepping motor drive circuit 22 for pulse to step control of a two phase stepping motor 20. The driver 24 in circuit 22 can be a device similar to the SAA 1027 which is a complete integrated circuit pulse to step drive circuit. Driver 24 of said circuit has a pulse input, a square wave output and a four step sequence logic. In this prior art circuit pulses (from a pulse generator (not shown)) are fed to the trigger input T. The motor 20, connected to the output, steps on the positive going edge of each pulse. The direction of rotation of the motor 20 is controlled by a voltage level applied to a gate input R. A set input S is used to set the motor 20 to a logic state by applying a low level voltage to S. Additionally, a power input P to the driver 24 is required. Thus, the SAA 1027 driver 24 requires (for a typical two phase, four coil stepping motor) at least four inputs, the power input P, the trigger input T, the set input S, and the direction input R. Together with the ground return wire, a minimum four wire cable is required from the power source (not shown) to the motor drive circuit 22.

The phase drive outputs Q4, Q3, Q2 and Q1 must be sequenced in the right order for proper motor operation. To change the running direction of the motor, the logic sequence is reversed. A trigger input signal on T to the driver 24 advances the sequence one step at a time, and the direction input signal on R determines the direction of rotation. For a typical two phase stepping motor a four step sequence is used to complete one electrical cycle. For the sequence logic, commonly a shift left shift/right register is used and an input signal on input R is used to control the direction of shifting.

The object of the present invention is to reduce the number of wires between the power source and the motor drive logic circuit. This object is achieved by providing a means to modulate the power source and by modifying the prior art conventional motor drive circuit. The modulation of the power source is achieved by switching the power source off and on momentarily, creating a series of very short duration pulses superimposed on the power supply line which also serves as the control lead. FIG. 2 is a block diagram of the present invention in which a polyphase bidirectional stepping motor 42 is controlled by a modified motor drive circuit 44 having only a two lead connection to a modulated power source 46. As shown in FIGS. 2 and 3, there are two major sections to a control circuit 40 for a bidirectional variable speed stepping motor 42, the motor drive circuit 44 and the modulated power source 46.

FIG. 3 is a schematic diagram of the control circuit 40 of the present invention which includes a circuit 46 to modulate the power source and the modified motor drive circuit 44. Turning to the modulated power source 46, as illustrated in FIG. 3, the present invention provides for the modulation of the power source by using a pair of switching transistors 50,52 to switch the power source off momentarily, or for periods of a very short duration. For every momentary turnoff of the power source, the motor drive logic 48 logic of the stepping motor drive circuit 44 will step one step of the sequence. To advance the sequence more than one step at a time or to step the motor in the reverse direction, a burst of multiple turnoffs are given. The number of turnoffs in a burst depends on how many phases the motor has or how many steps in a sequence there are for one electrical cycle.

A switching control circuit 46 for modulating the power source is illustrated in the left-hand section of FIG. 3 wherein a clock pulse is fed to a counter CD 4029 and to a monostable vibrator 555 which outputs a burst of pulses to a pair of switching transistors 50,52, which switch the motor supply lead 54 off momentarily. Switching control circuit 46 could be part of a microprocessor used to control a system incorporating a stepping motor, or any equivalent circuit which delivers bursts of pulses on supply lead 54.

The bursts of pulses proceed through the two switching transistors 50, 52 over a two wire connection between the modulated power source 46 and the motor drive circuit 44. One of the two wires may be ground return and the other wire is the power supply line 54. The pulses are superimposed on the power supply line 54 and then fed to an SAA 1027 translator (driver) 48, which is a stepping motor pulse-to-step logic module in the motor drive circuit 44. This stepping motor logic module 48 and its associated motor drive circuitry 44 could be any other custom IC stepping motor drive circuit. The pulse modulated power supply line 54 is fed directly to the trigger input T of the driver circuit 48 and, through a low pass filter 56, to the power input P and to the set input S of driver 48. The trigger input T is the only input to driver 48 which recognizes the pulses; the other driver 48 inputs are filtered or grounded. The drive logic 48, the SAA 1027 translator, has a low power requirement and therefore the components of the low pass filter 56 can be small. Due to the inductance and the response of the motor 42, the short duration pulses on the power supply lead common 54 are not recognized and therefore have no effect on the operation of the motor. However, the pulses fed to the trigger input T will step the sequence logic one step for each pulse.

A typical two phase stepping motor has a four step sequence. In the present invention, only a one direction sequence logic is used and the direction of the motor is changed by advancing the four step sequence logic, used for a two phase motor, by three steps at a time, thus generating a reverse sequence and eliminating the input terminal R of FIG. 1 to the motor drive circuit 44. In the modified drive circuit 44, this input terminal is grounded. For a stepping motor having an n step sequence, n−1 turnoffs will reverse the rotation.

Figure 4:
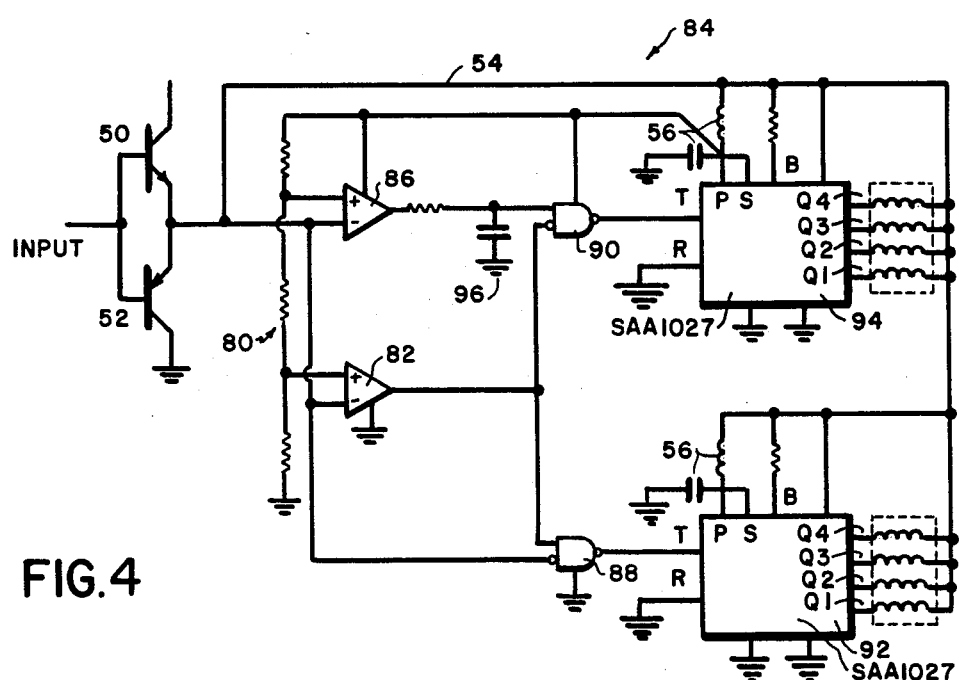
FIG. 4 is a circuit diagram of the two wire stepping motor control circuit of FIG. 3 showing the control of two motors using the same modulated power supply lead.

The present circuit is adaptable to control more than one motor on the same supply line by using pulse amplitude modulation, as shown in FIGS. 4 and 5. Furthermore, the torque of the motor may also be controlled by the amplitude of the supply line.

FIG. 4 is a schematic diagram illustrating the use of pulse amplitude modulation in the control circuit of the present invention to control more than one stepping motor using bursts of pulses on the common supply line for all stepping motors connected to circuit 84. In circuit 84, a voltage divider plus one voltage comparator and one gate are required for each motor drive logic. Each gate controls the flow of pulses to one trigger input. For purposes of exposition an example with two stepping motors is described and illustrated. In FIG. 4 the multiple motor drive circuit 84 receives bursts of pulses on power supply line 54, which is the common supply line. The modulated power supply line is fed to a first input of each of two voltage comparators 82, 86 and to a first input of gate 88, the second input of which is connected to the output of comparator 82. The filtered supply voltage from filter 56 is also fed to a voltage divider 80. A second input of each comparator is connected to a different voltage reference point on voltage divider 80. The amplitude of the pulse on power supply line 54 determines which motor drive is triggered. A larger negative going pulse passes through both comparators 82,86, but the output of comparator 82 will close gate 90 before the pulse can pass through the time delay 96, thus inhibiting the triggering of drive 94 and enabling gate 88 to trigger drive 92. A pulse with lesser amplitude will only pass through comparator 86 and gate 90 to trigger drive 94. Meanwhile the power input P and set input S of driver 92 are fed from common 54 which connects to all motors on the circuit 84. Driver 92 operates identically to driver 48 of FIG. 3. The power P and set S inputs for the second motor come from the same common 54.

It should be noted that pulses or bursts of pulses of varying amplitude can be intermixed since the voltage comparators 82, 86 will discriminate between the pulses.

Figure 5A:
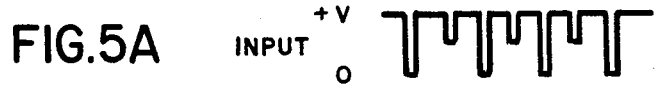
FIGS. 5A, 5B, 5C show the pulse modulated wave forms of the circuit of FIG. 4 at various points therein.
Figure 5B:
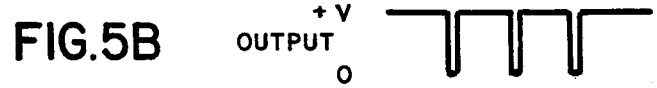
Figure 5C:
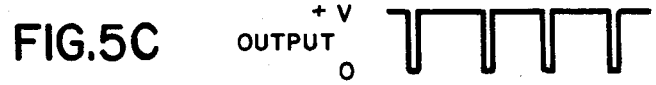

FIGS. 5A, 5B and 5C illustrate the pulse wave forms for the circuit of FIG. 4. The pulses received at the input to circuit 84 are shown in the top line. The pulses received at the trigger input T of driver 94 are shown in the middle line. The pulses received at the trigger input T of driver 92 are shown on the bottom line.

The principal advantage over the prior art is the reduction of the wires from the power source to the motor drive logic to two, simplifying the connections between the modulated power source and the motor drive circuit, which may be very important and economical in many applications.

I claim:

1. A control circuit for a bidirectional variable speed stepping motor having a plurality of coils comprising:
   a power source;
   a motor drive logic circuit disposed adjacent said motor, including pulse-to-step logic means having a trigger input, a set input, and a power input;
   two wires connecting said power source to said motor drive logic circuit, one of said wires being a power supply line;
   means to modulate said power supply line with short duration pulses by switching off said power source for periods of very short duration, whereby the number and duration of said pulses signal a sequence to said pulse-to-step logic means;
   said modulated power supply line being connected to a common point of said motor coils and to the trigger input of said pulse-to-step logic means so that each pulse advances said stepping motor by one step and said pulses further control the direction of rotation, speed and angular distance of said stepping motor;
   said power supply line being also connected through a low pass filter to the power input and the set input of said motor drive logic circuit whereby said pulses are not recognized by said power input, said set input and said motor.

2. The circuit of claim 1 wherein said motor drive logic circuit uses a one direction sequence and, for an n step/sequence, n−1 pulses on said trigger input cause a reversal of direction of said motor.

3. The circuit of claims 1 or 2 further comprising:
   means to recognize pulses of different amplitude on a single power supply line.

4. The circuit of claim 3 further comprising:
   means to control at least two stepping motors by modulating the amplitude of pulses on one power supply line.

5. The circuit of claim 4 wherein:
   said means which recognize pulses direct all pulses of one amplitude to the trigger input of a first motor drive logic circuit, while directing pulses of other amplitudes to trigger inputs of other motor drive logic circuits such that each trigger input receives only pulses of only one amplitude.

6. The circuit of claim 4 wherein said means to control at least two stepping motors comprises:
   a voltage divider connected to said filtered modulated power supply line;
   one voltage comparator for each motor drive logic, said voltage comparator having one input connected to said modulated power supply line to receive unfiltered pulses, each voltage comparator having a second input connected to a different voltage reference point on said voltage divider;
   a gate connected to the output of each voltage comparator to control the trigger input of said motor drive logic connected to said voltage comparator, feeding pulses of one amplitude to said trigger;
   delay means connected between the output of at least one of said voltage comparators and the input of said gate connected to said voltage comparator such that pulses of a greater amplitude will have time to block said gate for pulses of a lesser amplitude, preventing said pulses of greater amplitude from passing to said trigger input controlled by said gate and opening a second gate for the pulses of greater amplitude, allowing pulses of greater amplitude to pass to a second trigger input controlled by said second gate; and
   wherein for n motors connected to said modulated power source, there are n voltage comparators, n gates and said delay means are connected to a sufficient number of said gates to insure that only one gate feeds a trigger input at a time.

* * * * *